May 24, 1966 R. COLOMBO 3,252,182
SCREW PRESS FOR EXTRUSION OF PLASTICS
Filed Jan. 15, 1964 2 Sheets-Sheet 1
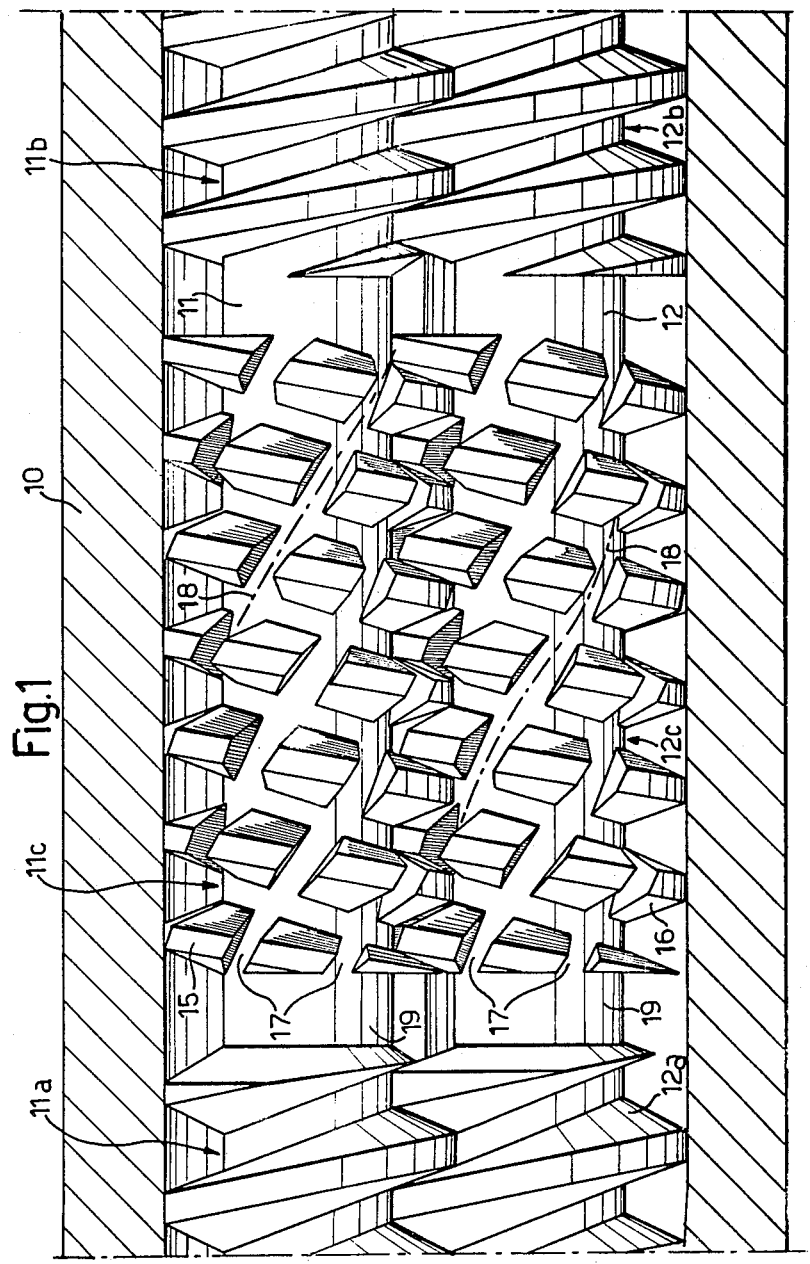

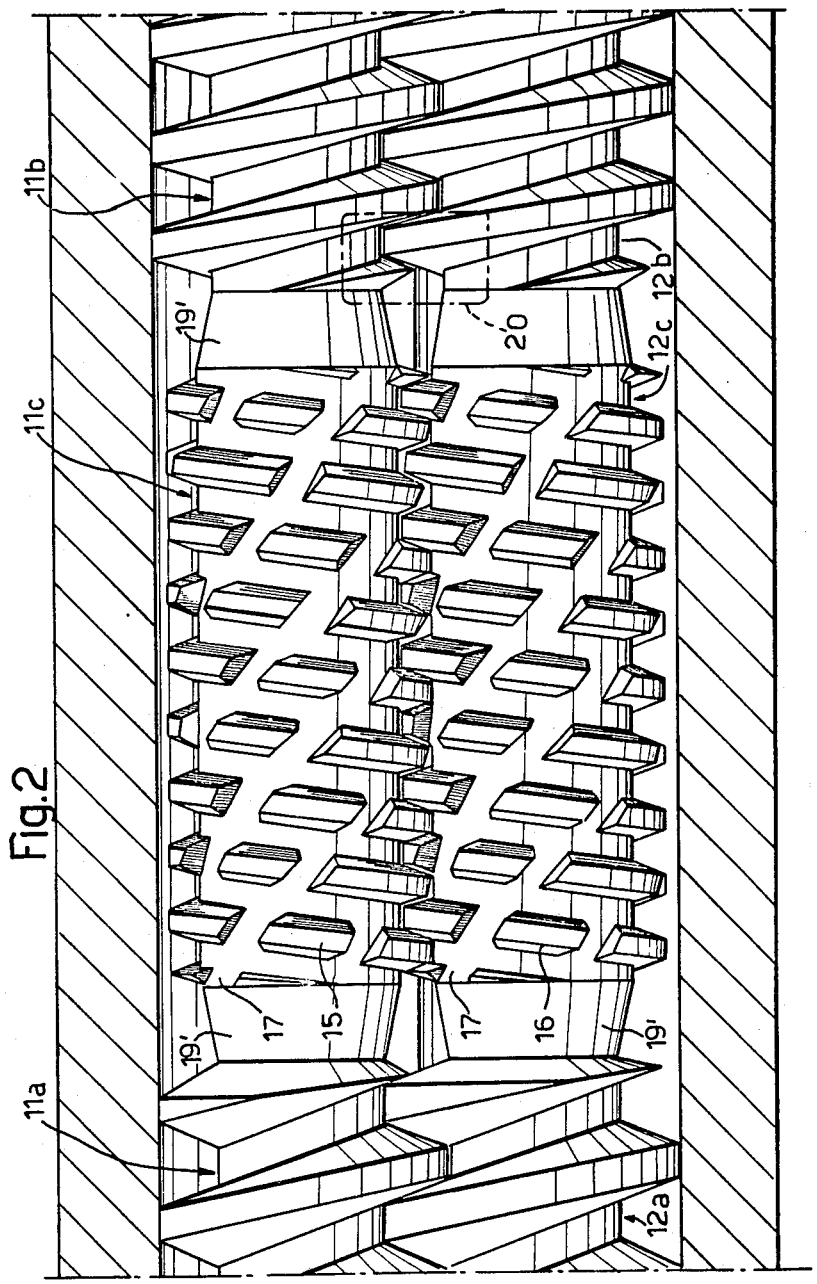

3,252,182
SCREW PRESS FOR EXTRUSION OF PLASTICS
Roberto Colombo, Turin, Italy, assignor to Lavorazione Materie Plastiche (L.M.P.) S.p.A., Turin, Italy
Filed Jan. 15, 1964, Ser. No. 337,782
Claims priority, application Italy, Jan. 22, 1963, 2,003/63
10 Claims. (Cl. 18—12)

This invention relates to screw press extruders for thermoplastic materials of the type comprising a pair of closely intermeshing screws rotating in and closely surrounded by a common barrel.

An object of this invention is to provide a press which is capable of a high output as compared with conventional presses.

A further object of the invention is to improve homogeneousness of the extruded product.

A special object of this invention is to provide a press affording a high output though employing surprisingly short screws.

According to this invention the screws each comprise two feed-compression sections having interposed therebetween a mixing section comprising a reverse helical flight exhibiting voids or gaps which are angularly staggered in contiguous turns of the flight, the reverse flight on one screw closely meshing with the reverse flight on the other screw.

Further characteristic features and advantages of this invention will be understood from the appended description referring to the accompanying drawing, wherein:

FIGURE 1 is an axial sectional view of an embodiment, and

FIGURE 2 is an axial sectional view of a further embodiment.

In both figures, similar or equivalent parts are denoted by the same reference numerals, provided with an index if necessary.

Both figures show an intermediate portion of a barrel or cylinder of an extrusion press, neglecting such parts as do not affect the gist of this invention. The barrel is denoted by 10 and encloses a pair of intermeshing screws 11, 12. The screws each comprise a first feed-compression section 11a, 12a, respectively, and a second feed-compression section 11a, 12b, respectively, having continuous closely intermeshing flights. In the specific case the screws rotate in the same direction, as shown by the concordant inclination of the flights, and are closely surrounded by the barrel 10. The latter is constant in cross sectional shape. The direction of rotation is assumed such that the material is fed from the left to the right in both figures.

A mixing section 11c, 12c, respectively, is interposed between the two above mentioned sections on each screw. The mixing sections each comprise a screw threaded portion having a reverse flight including gaps which are angularly staggered in contiguous turns.

More particularly, in the embodiment shown in FIGURE 1 the sections 11c, 12c, which are similar therebetween, each have a core equal in diameter to the core in the sections ahead and behind said sections 11c, 12c, respectively. A helical flight 15, 16, respectively, extends from said core and is formed with gaps 17, the outer diameter of the flight being the same as the outer diameter of the continuous flights on the feed-compression sections. The interrupted flights 15, 16 intermesh in a substantially material-tight manner. The gaps 17 are advantageously aligned along helices 18 appreciably exceeding in pitch the pitch of the feed-compression sections, the hand of the helices 18 being the same as the hand of the feed-compression sections. The pitch of the interrupted flights 15, 16 is in any case smaller than the pitch of said feed-compression sections. The mutual angular setting of the mixing sections 11c, 12c is such that on rotation of the screws the solid portions of the flights 15, 16 consecutively obstruct the helical ways 18 formed by the gaps 17.

In operation the feed sections 11a, 12a force the material to the right in the figure, the flights 15, 16 on the mixing sections tending to impose on the material a reverse thrust from the right to the left in the manner known per se in the art. This sets up a back-pressure at the region directly ahead the mixing sections. The screws are each advantageously formed at said region with a smooth portion 19, which is possibly polished. It will be obvious to experts that the material compressed as above is directed through the gaps 17 in flights 15, 16 along the helical ways 18 towards the sections 11b, 12b. However, on rotation of the screws the solid portions of the flights 15, 16 are consecutively interposed on said helical ways and displace the material therefrom along the grooves between the flights after the manner of a reflux stream. Such a stream obviously intersects the helical ways 18, whereby the material is mixed in an extraordinarily thorough manner.

Generally the cross sectional area of all the gaps 17 in a full turn of each of the flights 15, 16 is smaller than the overall axially projected area of the solid flight portions between said gaps. The back-pressure and thoroughness of mixing depend upon the ratio of said areas. Said ratio can be adjusted by modifying the number and angular width of the gaps and radial depths thereof; in the specific embodiment the radial depth of the gaps 17 equals the height of the flight.

The embodiment shown in FIG. 2 distinguishes from the embodiment in FIG. 1 mainly in that the core of the mixing sections 11c, 12c is enlarged with respect to the cores of the feed-compression sections, and merges into the latter over smoth frusto-conical portions 19'. Consequently, the outer diameter of the interrupted flights 15, 16 is smaller, so that a free circumferential region is formed between the crest of said flights and the inner surface of the barrel 10, over which the material is drawn (extruded) under the thrust in the sections 11a, 12a. However, in operation, the drawing stream is heavily disturbed by the material reaching said region from both the grooves between the flights 15, 16 and helical ways 18, whereby a thorough mixing occurs at this region also.

Both in the case of FIG. 1 and still more of FIG. 2 the material entering the mixing sections is appreciably compressed between the screws and barrel, affording an excellent tightness against gas and vapour pressure, whereas the material leaving said sections is in a substantially decompressed condition. Therefore, according to a feature of this invention, a passage 20 is formed past the mixing sections in the barrel 10, said passage being connectable with a suction pump for the purpose of removing by suction any gas or vapour evolved by the material. The feed-compression sections 11b, 12b are advantageously followed by a further pair of mixing sections similar to sections 11c, 12c, and by a further pair of feed-compression sections, and so on, thereby to provide three feed-compression sections at least separated by mixing sections of the above described type. The gaps 17 in the flights 15, 16 can differ in size or in overall area in the consecutive mixing sections. Moreover, the first mixing section shall be advantageously of the type shown in the embodiment of FIG. 1, the subsequent mixing sections being of the type shown in FIG. 2. It has been found that with a press arrangement of this type the lengths of the feed-compression sections can be appreciably reduced, thereby reducing the overall length of the screws to an unusual extent, yet affording an excellent homogeneousness of the extrudate at a surprisingly high production rate.

What I claim is:

1. A screw press for extruding plastics comprising a housing, a pair of parallel intermeshing screws journaled for rotation in said housing, each screw member comprising two spaced feed-compression sections having equal diameter cylindrical cores and equal diameter screw flights having a close fit with said housing and with the respective intermeshed feed-compression sections of the other screw member and a mixing section intermediate said feed-compression sections having a core of larger diameter than said cores and a screw flight of smaller diameter than said flights spaced from said housing.

2. A screw press according to claim 1 wherein the screw flights of said mixing section are reversed with respect to the screw flights of said feed-compression sections.

3. A screw press according to claim 2 wherein the pitch of the screw flights of said mixing section is less than the pitch of the screw flights of said feed-compression sections.

4. A screw press according to claim 2 wherein the reverse screw threads of said mixing section are interrupted by gaps with said gaps in subsequent turns of the thread being helically aligned with each other to provide helical paths for the plastic in the same direction as said feed-compression sections.

5. A screw press according to claim 4 wherein the overall area of said gaps in a full turn of said reverse screw thread is smaller than the overall axially projected areas of the solid portions of said full turn between said gaps.

6. A screw press according to claim 4 wherein said helical paths have a greater pitch than the screw pitch of said feed-compression sections.

7. A screw press according to claim 1 wherein said screws rotate in the same direction.

8. A screw press according to claim 1 wherein a smooth section is formed on each screw between said mixing section and each of said feed-compression sections.

9. A screw press according to claim 1 wherein each screw is comprised of a plurality of mixing sections having a feed-compression section before and after each of said mixing sections with respect to the direction of feed.

10. A screw press according to claim 9 wherein a degassing vent is provided in said housing in communication with one of said feed-compression sections which follows a mixing section in the direction of feed.

References Cited by the Examiner

UNITED STATES PATENTS

| Re. 23,880 | 9/1954 | Heston | 18—12 |
| Re. 23,948 | 2/1955 | Fuller | 18—12 |
| 2,631,016 | 3/1953 | De Laubarède | 18—12 X |
| 2,632,203 | 3/1953 | De Laubarède | 18—12 |
| 2,733,051 | 1/1956 | Street. | |
| 3,085,288 | 4/1963 | Street | 18—12 |

FOREIGN PATENTS 734,182  7/1955  Great Britain.

WILLIAM J. STEPHENSON, *Primary Examiner.*

L. S. SQUIRES, *Assistant Examiner.*